United States Patent [19]
Dupuy et al.

[11] Patent Number: 5,613,203
[45] Date of Patent: Mar. 18, 1997

[54] HANDOVER METHOD AND DEVICE FOR A CELLULAR MOBILE RADIO SYSTEM

[75] Inventors: Pierre Dupuy; Vinod Kumar, both of Paris, France

[73] Assignee: Alcatel N.V., Amsterdam, Netherlands

[21] Appl. No.: 329,844

[22] Filed: Oct. 27, 1994

[30] Foreign Application Priority Data

Oct. 28, 1993 [FR] France ................................. 93 12890

[51] Int. Cl.⁶ ...................................................... H04Q 7/38
[52] U.S. Cl. ...................... 455/33.2; 455/56.1; 370/337; 379/60
[58] Field of Search ........................... 455/33.1, 33.2, 455/34.1, 34.2, 54.1, 56.1, 62, 67.1; 370/95.3; 379/58, 59, 60

[56] References Cited

U.S. PATENT DOCUMENTS

| | | | |
|---|---|---|---|
| 5,109,528 | 4/1992 | Uddenfeldt | 379/60 |
| 5,230,082 | 7/1993 | Ghisler et al. | 455/34.1 |
| 5,327,577 | 7/1994 | Uddenfeldt | 455/33.2 |
| 5,483,668 | 1/1996 | Malkamaki et al. | 455/33.2 |
| 5,487,185 | 1/1996 | Halonen | 455/33.1 |

FOREIGN PATENT DOCUMENTS

| | | |
|---|---|---|
| 0347396A1 | 12/1989 | European Pat. Off. . |
| 0430106A2 | 6/1991 | European Pat. Off. . |

OTHER PUBLICATIONS

*Patent Abstracts Of Japan*, vol. 11, No. 77 (E–487) 7 Mar. '87 & JP–A–61 232 792 (NEC).

*Primary Examiner*—Reinhard J. Eisenzopf
*Assistant Examiner*—Nguyen Vo
*Attorney, Agent, or Firm*—Sughrue, Mion, Zinn, Macpeak & Seas

[57] ABSTRACT

In a method for handover between old and new cells of a time-division multiple access (TDMA) cellular mobile radio system a call between a mobile station and the system, initially effected via the old cell on a first channel defined by a first on air timeslot and a first set of frequencies comprising at least one frequency, is effected via the new cell on a new channel defined by a second on air timeslot and a second set of frequencies comprising at least one frequency. The first and second on air timeslots are identical, the first and second sets of frequencies are separate, and the method consists in transmitting, after verifying that the second on air timeslot identical to the first on air timeslot is available in the new cell, a frequency indication message indicating to the mobile station the second set of frequencies so that the mobile station continues the call using the same on air timeslot and the second set of frequencies.

11 Claims, 2 Drawing Sheets to the new base station.

HANDOVER METHOD AND DEVICE FOR A CELLULAR MOBILE RADIO SYSTEM

BACKGROUND OF THE INVENTION

1. Field of the Invention

The present invention concerns a handover method and device for a cellular mobile radio system.

2. Description of the Prior Art

In a cellular mobile radio system (a system conforming to the GSM standard, for example), each cell has transceiver means for transmitting and receiving radio signals and a frame unit one function of which is to manage the radio channels in the associated cell; this combination is known as a base transceiver station, or base station for short. The transceiver means can send and receive radio signals on one frequency or on more frequencies if frequency hopping is used.

In time-division multiple access (TDMA) mobile radio systems, calls are transmitted on radio channels each characterized by a timeslot in the TDMA frame which is repeated periodically and a transmission frequency (or a plurality of transmission frequencies if frequency hopping is used). The timeslot in the TDMA frame corresponds to an on air timeslot for the mobile stations.

If a mobile station passes from one cell, called the old cell, to another cell, called the new cell, the continuity of the call in progress must be maintained; the availability of timeslots and the frequency or frequencies used for exchanging speech data change on moving from one cell to another. One method for providing this continuity in mobile radio systems is the intercellular transfer procedure usually referred to as "handover".

In the conventional way, the handover procedure entails activating a radio channel in the new cell, i.e. making it available to the mobile station for exchanging speech data, and then sending a handover instruction to the mobile station concerned so that it uses the new channel allocated to it. This is followed by a phase in which the mobile station is synchronized to the new base station.

After this synchronization phase the mobile station sends the new base station a message (called the SABM message in GSM terminology) initializing transmission context data (this data is known as LAPDm data; for more information on this topic see "The GSM System for Mobile Communications", M. MOULY and M. B. PAUTET, published by the authors, 1992, pages 261–262 and 268 through 277) relating to the new logical link (mobile station—new base station) created. This message is acknowledged by the new base station (in a message called the UA message in GSM terminology).

Between the time at which the mobile station receives the handover instruction and the time at which synchronization is completed transmission of speech data is interrupted with the result that either significant deterioration of speech quality must be tolerated during this period or speech extrapolation software must be used.

In mobile radio systems covering urban areas with very high traffic levels small cells are used (radius less than a kilometer, usually 200 m to 300 m). In these microcellular systems handover is extremely frequent because there is a high probability of a mobile station crossing more than one cell during the same call, given the small size of the cells.

The handover procedure as just described is lengthy: the time elapsing between reception of the handover instruction by the mobile station and completion of the synchronization phase is in the order of 100 ms to 200 ms. It is totally unacceptable for speech quality to deteriorate for such a long period and several times in succession.

In such cases it is therefore necessary to use speech extrapolation; this is not satisfactory, however, since if speech is extrapolated by more than 80 ms the user can perceive that what he is hearing is not what he should be hearing.

To solve this problem, patent EP-A-0 347 396 proposes to carry out handover in such a way that the call continues in the same timeslot and on the same frequency in the new cell.

This method presupposes the continuous availability of identical frequencies in a plurality of adjoining cells, or dynamic management of frequency allocation on the basis of interference. A method of this kind is complex to implement in systems conforming to the GSM standard, in particular because of the interference that is likely to result.

Also, use of this method makes it necessary to verify two criteria: the availability of the timeslot in the new cell, and the availability of the frequency in the new cell. Most of the time there is little chance of these two criteria being satisfied simultaneously, with the result that this method can be used only in very rare cases.

One object of the present invention is to provide a handover method in which speech is interrupted for a shorter time than in the conventional methods.

Another object of the present invention is to provide a handover method which is simple to implement in systems conforming to the GSM standard and succeeds in a large proportion of cases in which handover is needed.

SUMMARY OF THE INVENTION

To this end the present invention proposes a method for handover between old and new cells of a time-division multiple access (TDMA) cellular mobile radio system, in which method a call between a mobile station and said system, initially effected via said old cell on a first channel defined by a first on air timeslot and on a first set of frequencies comprising at least one frequency, is transferred to be effected via said new cell on a new channel defined by a second on air timeslot and a second set of frequencies comprising at least one frequency, said first and second on air timeslots are identical, said first and second sets of frequencies are separate, and said method consists in transmitting, after verifying that said second on air timeslot identical to said first on air timeslot is available in said new cell, a frequency indication message indicating to said mobile station said second set of frequencies so that said mobile station continues said call using the same on air timeslot and said second set of frequencies.

The method of the invention reduces the time for which speech is interrupted from 100 ms or 200 ms to about 20 ms (the time needed to send the frequency indication message). Extrapolation can mask this interruption without difficulty with the result that handover is inaudible to users.

Furthermore, the only criterion to be satisfied is the availability of the same on air timeslot in the old and new cells. This criterion is satisfied in many cases, with the result that the method of the invention succeeds in a high proportion of cases in which handover is needed.

In accordance with the invention, if the old and new cells are from separate cellular sites, the method further entails, prior to sending of the frequency indication message, activation of the second channel in the new cell and supply to a frame unit of the new cell of data relating to the context of transmission between the mobile station and the old cell.

This avoids lengthy reinitialization of the radio connection.

Other features and advantages of the present invention will emerge from the following description of a method of the invention given by way of non-limiting illustrative example only.

DETAILED DESCRIPTION OF THE PREFERRED EMBODIMENT

Items shown in more than one figure are always identified by the same reference number.

Figure 1:
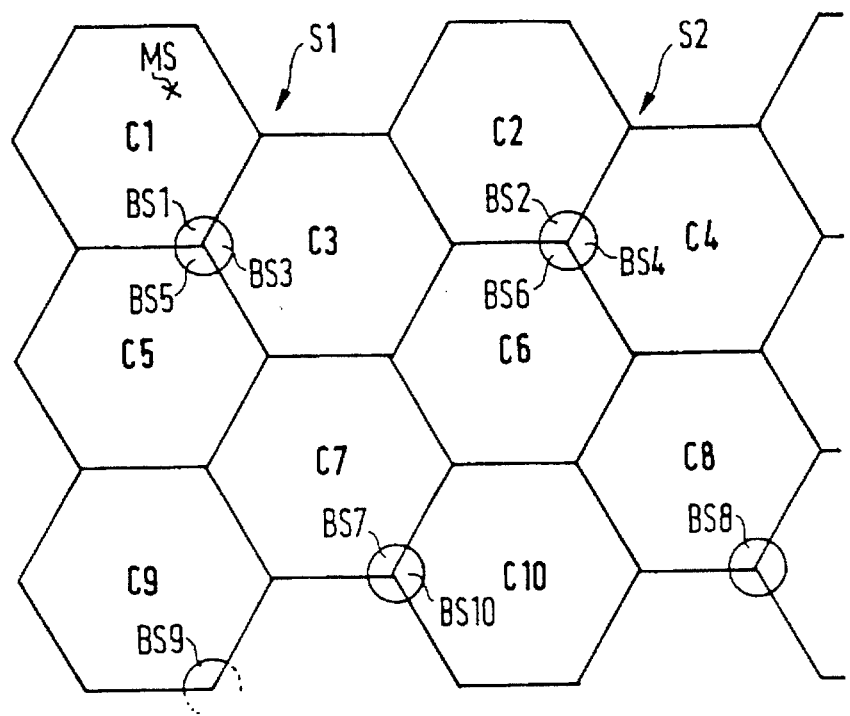
FIG. 1 is a diagrammatic representation of part of the structure of a cellular mobile radio system.

FIG. 1 shows part of a cellular mobile radio system, for example a system conforming to the GSM standard. This system comprises a plurality of cells C1 through C10, each cell having a respective base transceiver station BS1 through BS10.

In microcellular systems small cells are combined to form cellular sites. In this case the base stations associated with the cells of a site are combined at one place, so reducing installation costs and avoiding excessive hardware redundancy.

In the example shown there are two cellular sites S1 and S2. The site S1 combines the cells C1, C3 and C5 and the base stations BS1, BS3 and BS5 are combined at the same location, at the intersection of these three cells, substantially at the center of the cellular site. The site S2 combines the cells C2, C4 and C6.

To apply the method of the invention the base stations of the same or of separate cellular sites must be synchronized, i.e. the periods of their respective clocks must be the same, without their times necessarily being identical (it is shown below that this is necessary because the synchronization of the mobile station does not change immediately after handover in accordance with the invention).

In this example a mobile station MS is initially in cell C1, in the coverage area of base station BS1.

Figure 2:
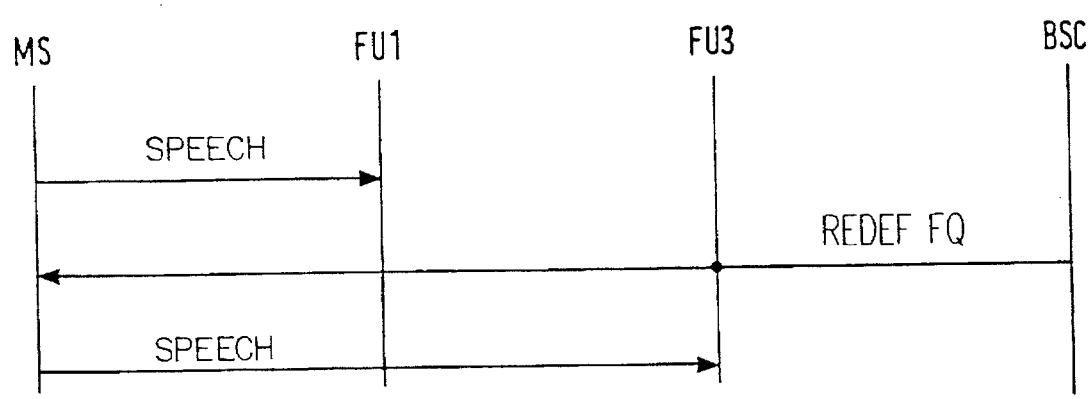
FIG. 2 shows the steps of the method of the invention when the old and new cells are from the same cellular site.

FIG. 2 shows the various steps of the method of the invention when the new and old base stations (BS3 and BS1, respectively) are on the same cellular site (S1).

Each base station comprises transceiver means and a frame unit. In the following description of the method of the invention with reference to FIG. 2, the functions of the frame unit and the transceiver means of the base station are separated. Why this is so is explained below.

Figure 4:
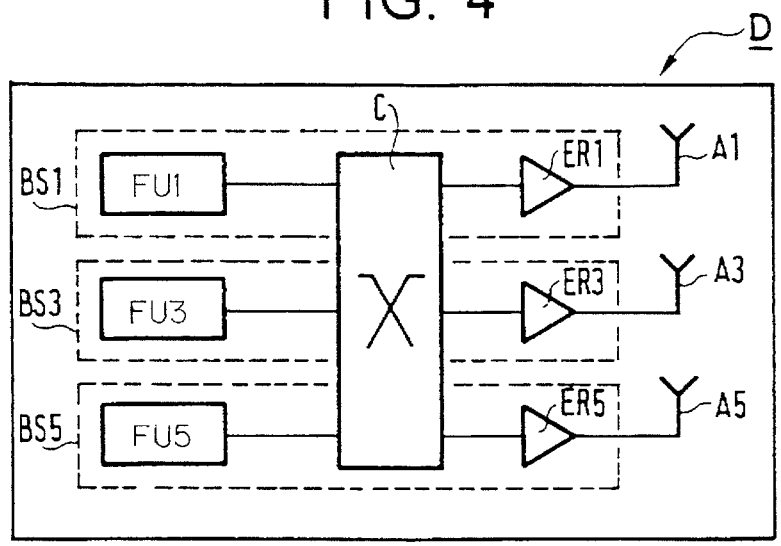
FIG. 4 is a diagrammatic representation of a device in accordance with the invention installed on a cellular site and serving as an intermediary for exchanging data with mobile stations.

The base stations BS1 and BS3 have frame units FU1 and FU3 and transceiver means ER1 and ER3 (see FIGS. 2 and 4).

A base station controller BSC is responsible for base stations BS1 and BS3. The controller BSC controls the various base stations for which it is responsible: to be more precise, it controls the frame units of those base stations and through them the associated transceiver means.

Measurement reports (signal/noise ratio, receive level, etc) are regularly supplied by the mobile station MS to the base station BS1 and vice versa. If these reports indicate that the quality of the call in progress via the transceiver means ER1 of base station BS1 is such that handover between cell C1 and cell C3 is needed, then the controller BSC verifies that the on air time slot corresponding to the radio channel used by the mobile station MS for exchanging speech data through the intermediary of base station BS1 is also available in cell C3, i.e. that it is not being used by the frame unit FU3 for a call involving another mobile station in cell C3.

If this is the case, the controller BSC advises the frame unit FU1 of the base station BS1 of the new frequency to be used for exchanging speech data with mobile station MS (or the new frequencies and the order in which they are to be used if frequency hopping is employed); it communicates this information in a "redefine frequency" (REDEF FQ) message constituting a frequency indication message; it also communicates the new frequency to the mobile station MS via the frame unit FU1. Alternatively, on receiving the REDEF FQ message, the frame unit FU1 can communicate the new frequency directly to the mobile station MS without the controller BSC having to send a new REDEF FQ message.

The REDEF FQ message(s) communicated to the frame unit FU1 and to the mobile station MS also tell the latter when to change frequency (the base stations of the cells between which the transfer is to be effected are synchronized).

The mobile station MS then has only to change its send and receive frequencies in line with the content of the REDEF FQ message to continue the call via the frame unit FU1 and the transceiver means ER3 of the base station BS3 (see FIG. 4). The call continues in the same on air time slot with the result that handover can be virtually transparent to the mobile station MS.

Remember that the "redefine frequency" message is conventionally used in systems conforming to the GSM standard when the frequency plan is modified; it is then sent to advise the base stations concerned, so that they use the new frequencies, and the mobile stations.

Accordingly, the method of the invention can use and adapt existing radio resources of the system.

The time for which speech is interrupted is reduced to 20 ms (the duration of the "redefine frequency" message sent to the mobile station MS). Before the message is sent the mobile station MS can continue to exchange speech data via FU1 and ER1. From the time indicated in the message, the mobile station MS continues the call in progress via FU1 and ER3. It can then send a message to acknowledge the change of frequency effected.

The device D combining the base stations of the cellular site S1 and adapted to implement the present invention is shown diagrammatically in FIG. 4. Each base station BS1, BS3 and BS5 (the contour of which is shown in dashed outline) comprises a respective frame unit FU1, FU3 and FU5 for managing the radio channels of the associated base station (a frame unit usually manages eight radio channels) and a respective radio signal transceiver ER1, ER3 and ER5 (or several if frequency hopping is used in the mobile radio system in question), each transceiver having a respective antenna A1, A3 and A5.

In accordance with the invention, the site S1 further includes a switch C connected to the output of each unit FU1, FU3 and FU5 and to the input of each transceiver ER1, ER3 and ER5. The switch C is controlled by the frame units, in particular after reception of "redefine frequency" messages. Thus, after reception of a "redefine frequency" message as defined with reference to FIG. 2, the unit FU1 of the base station BS1 is switched from ER1 to ER3.

By virtue of the invention the same frame unit can be retained before and after handover because the mobile station MS uses the same on air timeslot, only the frequency (or frequencies) changing.

On the other hand, the number of the timeslot associated with the call in progress on the TDMA frame may not be the same before and after handover. In this case, even if there is no change as far as the mobile station is concerned (the on air timeslot is retained, i.e. the mobile station still sends and receives at the same times), the time management effected by the frame unit in question (FU1) must be adapted so that the temporal organization (in particular the distribution between the traffic subchannels and the dedicated signalling subchannels) of the radio channel on the TDMA frame corresponding to this on air timeslot and used in connection with cell C1 is retained.

Advantageously, as compared with the prior art, the invention enables equipping of the cellular site with fewer frame units than there are cells. The frame units are then shared between the various cells on the same site, which represents a saving in equipment cost and improved system efficiency.

It is nevertheless possible to retain the initial dependency between the frame units and the associated cells, i.e. not to share the frame units even if handover is effected between cells of the same site (for example, if the base stations are not grouped together in the same place for the cells of the same site). In this case the method of the invention is identical to what will be described below with reference to FIG. 3.

In the application described with reference to FIG. 2, by using the invention exchanges at the Abis interface (between the frame units of the base stations and the controller BSC) are simplified because only the "redefine frequency" message is needed for handover between cells of the same site; as just explained, messages to activate the new channel and acknowledging this activation and messages deactivating the old channel and acknowledging this deactivation are no longer needed. This removes from the conventional handover process everything that is not needed when the call management equipments (frame unit) can remain the same during handover.

Also, the method of the invention requires only one criterion to be satisfied: availability in the new cell C3 of the time slot used when the mobile station is in cell C1; it is no longer necessary to verify that the same frequency is available, since the frequency used after handover is a frequency allocated to the new cell. There is therefore a higher probability of the method of the invention succeeding than that described in the prior art mentioned in the preamble. In practise the method of the invention can succeed in between one third and half the handovers, depending on the cell pattern used.

The method of the invention also avoids the mobile station having to send the SABM message since no new logical link is created, the mobile station continuing to be connected to same frame unit. This further simplifies the handover procedure.

The method of the invention has just been described in the case in which the old and new cells are from the same cellular site.

Figure 3:
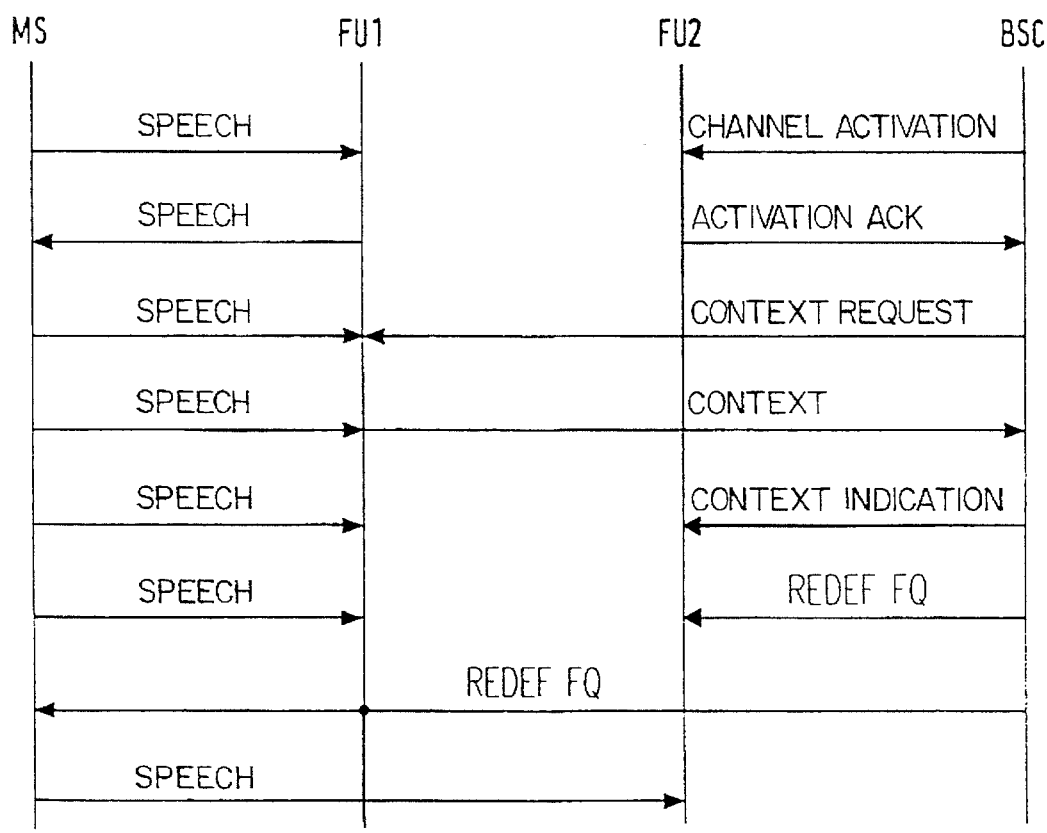
FIG. 3 shows the steps of the method of the invention when the old and new cells are not from the same cellular site.

If the old and new cells (C1 and C2, for example) are not from the same site, the method of the invention is as shown in FIG. 3.

In this situation it is no longer necessary to dissociate the function of the frame unit from that of the transceiver in the base stations because the two base stations belong to different cellular sites and it is no longer possible to share certain units.

After verifying the availability at BS2 of the on air timeslot used for the active call via BS1, the controller BSC activates the new channel at BS2 via frame unit FU2 (CHANNEL ACTIVATION message); the new channel uses the on air timeslot used for communication with BS1. The base station BS2 acknowledges activation of the new channel (ACTIVATION ACK message).

The controller BSC then requests the transmission context data from the old base station BS1, by means of the CONTEXT REQUEST message. This data includes the data LAPDm concerning the MS-BS1 logical link and data concerning the MS-BS1 physical link, for example the transmit power output of the mobile station MS, the transmit power output of BS1, the timing advance (to use the GSM terminology) used for communication with BS1, etc.

The base station BS1 then sends the BSC the requested data in a CONTEXT message. The BSC forwards the data to the base station BS2 in a CONTEXT INDICATION message.

The process then continues with sending by the BSC of one REDEF FQ message to BS2 and another REDEF FQ message to MS via BS1.

The call is interrupted only during sending of the REDEF FQ message to the mobile station MS. Before this the mobile station exchanges speech data with BS1 and after this, starting at the time indicated in the REDEF FQ message, it exchanges speech data with BS2.

The method of the invention again reduces the time for which speech is interrupted.

The SABM and UA messages are not needed because the LAPDm data is not reinitialized but sent to BS2.

Generally speaking, the method of the invention eliminates long interruptions during handover due to the necessity to reinitialize the radio channel. This is because:

in the case of handover between two cells from the same site, the procedure for connecting to the new cell can be eliminated by retaining the same frame unit so that changing cell amounts to a change of frequency in the base station (and in the mobile station, of course), in the case of handover between two cells not from the same site, the procedure for connecting to the new cell entails only transferring to the new base station the context required to maintain the logical and physical radio link, as well as the change of frequency.

Note also that the method of the invention also eliminates the synchronization phase.

In a microcellular network, because of the small size of the cells, the fact that the mobile station MS retains the same synchronization (the same timing advance) with BS1 and BS2 introduces only a small error which can be tolerated for a short time period because synchronization is periodically corrected even during a call.

The error corresponds to the distance error equal for the difference between the actual distance from the mobile station MS to the base station BS2 at the time of handover and the distance corresponding to the synchronization applied for communicating with BS1.

Also, during handover between two cells from the same site (cells C1 and C3, for example), because of the combination of the transceiver means the timing advance used remains the same before and after transfer, so that eliminating the synchronization phase is no problem.

The method of the invention is therefore more advantageous in a microcellular system.

To be adapted to implement the method of the invention the controller BSC must include:

means for verifying if the on air timeslot used in connection with the old cell is available in the new cell, in the case of handover between two different cellular sites, means for activating the new channel at the new cell and means for requesting and indicating transmission context data, means for generating and sending "redefine frequency" messages.

These means can be incorporated into the controller BSC in the form of software modifications, i.e. existing resources within the BSC are adapted to operate in accordance with the invention.

The mobile station is not affected by these changes, since it is designed in GSM systems to be capable of reacting to a "redefine frequency" message.

For optimum use of the method of the invention it is preferable to optimize radio channel allocation management so that an on air timeslot is available in a maximum number of cells at the same time.

Of course, the invention is not limited to the embodiment that has just been described.

In particular, it is not necessary to use a "redefine frequency" message to indicate the new frequency or frequencies to be used after handover, although this is advantageous. It is possible to design a new message for this purpose only.

Reference to the frequency of a channel applies equally to the set of frequencies associated with the channel if frequency hopping is used.

Further, the invention applies equally to the situation in which handover is required between cells under the control of different controllers BSC.

Finally, any means as described can be replaced by equivalent means without departing from the scope of the invention.

There is claimed:

1. Method for handover between old and new cells of a time-division multiple access (TDMA) cellular mobile radio system, in which method a call between a mobile station and said system, initially effected via said old cell on a first channel defined by a first on air timeslot and on a first set of frequencies comprising at least one frequency, is transferred to be effected via said new cell on a new channel defined by a second on air timeslot and a second set of frequencies comprising at least one frequency, said first and second on air timeslots are identical, said first and second sets of frequencies are separate, and said method consists in transmitting, after verifying that said second on air timeslot identical to said first on air timeslot is available in said new cell, a frequency indication message indicating to said mobile station said second set of frequencies so that said mobile station continues said call using the same on air timeslot and said second set of frequencies.

2. Method according to claim 1 wherein when said system is a system conforming to the GSM standard said frequency indication message is a "redefine frequency" message.

3. Method according to claim 1 wherein said frequency indication message also tells said mobile station at what time to start using said second set of frequencies.

4. Method according to claim 1 wherein said call is interrupted only during sending to said mobile station of said frequency indication message.

5. Method according to claim 1 wherein, when said old and new cells are from separate cellular sites, said method further entails, before sending said frequency indication message, activating said new channel at said new cell and supplying to a frame unit of said new cell data relating to the transmission context between the mobile station and the old cell.

6. Method according to claim 5 wherein said data is transferred from a frame unit associated with said old cell to said frame unit associated with said new cell.

7. Method according to claim 5 wherein said data relating to the transmission context concerns the physical link and the logical link between said mobile station and said old cell.

8. Device for implementing a method for handover between old and new cells of a time-division multiple access (TDMA) cellular mobile radio system, in which method a call between a mobile station and said system, initially effected via said old cell on a first channel defined by a first on air timeslot and on a first set of frequencies comprising at least one frequency, is transferred to be effected via said new cell on a new channel defined by a second on air timeslot and a second set of frequencies comprising at least one frequency, said first and second on air timeslots are identical, said first and second sets of frequencies are separate, and said method consists in transmitting, after verifying that said second on air timeslot identical to said first on air timeslot is available in said new cell, a frequency indication message indicating to said mobile station said second set of frequencies so that said mobile station continues said call using the same on air timeslot and said second set of frequencies, said device comprising, for cells of the same site, radio signal transceiver means for each of said cells, each using one of said sets of frequencies, a frame unit whose functions include radio channel management and shared by each of said cells of said site, and switching means whereby, at the time of handover between said old cell and said new cell, said frame unit is switched by said switching means from said transceiver means associated with said old cell to said transceiver means associated with said new cell.

9. Device according to claim 8 comprising not more frame units than said cellular site comprises cells.

10. Base station controller for implementing a method for handover between old and new cells of a time-division multiple access (TDMA) cellular mobile radio system, in which method a call between a mobile station and said system, initially effected via said old cell on a first channel defined by a first on air timeslot and on a first set of frequencies comprising at least one frequency, is transferred to be effected via said new cell on a new channel defined by a second on air timeslot and a second set of frequencies comprising at least one frequency, said first and second on air timeslots are identical, said first and second sets of frequencies are separate, and said method consists in transmitting, after verifying that said second on air timeslot identical to said first on air timeslot is available in said new cell, a frequency indication message indicating to said mobile station said second set of frequencies so that said mobile station continues said call using the same on air timeslot and said second set of frequencies, said base station controller comprising:

first means for verifying if said second time slot is available is at said new cell, second means for generating and sending said frequency indication messages.

11. Base station controller for implementing a method for handover between old and new cells of a time-division multiple access (TDMA) cellular mobile radio system, in which method a call between a mobile station and said system, initially effected via said old cell on a first channel defined by a first on air timeslot and on a first set of frequencies comprising at least one frequency, is transferred to be effected via said new cell on a new channel defined by a second on air timeslot and a second set of frequencies comprising at least one frequency, said first and second on air timeslots are identical, said first and second sets of frequencies are separate, and said method consists in transmitting, after verifying that said second on air timeslot identical to said first on air timeslot is available in said new cell, a frequency indication message indicating to said mobile station said second set of frequencies so that said mobile station continues said call using the same on air timeslot and said second set of frequencies, in which method, when said old and new cells are from separate cellular sites, said method further entails, before sending said frequency indication message, activating said new channel at said new cell and supplying to a frame unit of said new cell data relating to the transmission context between the mobile station and the old cell, said controller comprising:

first means for verifying if said second time slot is available at said new cell, second means for activating said second channel, third means for requesting and indicating said transmission context data, fourth means for generating and sending said frequency indication message.

* * * * *